United States Patent
Havranek et al.

(10) Patent No.: US 12,041,947 B2
(45) Date of Patent: Jul. 23, 2024

(54) CHEWY CONFECTIONERY PRODUCT

(71) Applicant: WM. WRIGLEY JR. COMPANY, Chicago, IL (US)

(72) Inventors: Jiri Havranek, Prague (CZ); Josef Jindrich, Prague (CZ); Katerina Kasparova, Prague (CZ); Jiri Baron, Prague (CZ)

(73) Assignee: Wm. Wrigley Jr. Company, Chicago, IL (US)

( * ) Notice: Subject to any disclaimer, the term of this patent is extended or adjusted under 35 U.S.C. 154(b) by 69 days.

(21) Appl. No.: 16/646,324

(22) PCT Filed: Sep. 13, 2018

(86) PCT No.: PCT/US2018/050838
§ 371 (c)(1),
(2) Date: Mar. 11, 2020

(87) PCT Pub. No.: WO2019/055626
PCT Pub. Date: Mar. 21, 2019

(65) Prior Publication Data
US 2020/0288745 A1 Sep. 17, 2020

Related U.S. Application Data

(60) Provisional application No. 62/558,929, filed on Sep. 15, 2017.

(51) Int. Cl.
*A23G 3/42* (2006.01)
*A23L 5/30* (2016.01)
*A23L 29/212* (2016.01)

(52) U.S. Cl.
CPC ............... *A23G 3/42* (2013.01); *A23L 5/30* (2016.08); *A23L 29/212* (2016.08); *A23V 2002/00* (2013.01)

(58) Field of Classification Search
CPC ........................................................ A23G 3/42
See application file for complete search history.

(56) References Cited

U.S. PATENT DOCUMENTS 3,218,177 A * 11/1965 Robinson ............... A23G 3/42
426/578
2002/0001665 A1 * 1/2002 Barrett ................... A23G 3/346
426/661

(Continued)

FOREIGN PATENT DOCUMENTS

EP 1023841 A1 8/2000
EP 1342417 A1 9/2003

(Continued)

*Primary Examiner* — Stephanie A Cox

(57) ABSTRACT

The present disclosure is directed to chewy confectionery products. More specifically, the present disclosure is directed to uncoated chewy confectionery products comprising starch as a hydrocolloid, sucrose, and a glucose syrup. The uncoated chewy confectionery products are shape stable, shelf stable, and less sticky than traditional chewy confectionery products. Advantageously, the chewy confectionery products of the present disclosure have a texture similar to traditional chewy confectionery products, but do not require a protective coating or wrapper to maintain their stability.

17 Claims, 3 Drawing Sheets

(56) References Cited

U.S. PATENT DOCUMENTS

| | | | | |
|---|---|---|---|---|
| 2006/0257549 A1* | 11/2006 | Overly, III | ............... | A23G 3/54 |
| | | | | 426/660 |
| 2008/0248174 A1* | 10/2008 | Martincich | ............... | A23G 3/54 |
| | | | | 426/304 |
| 2015/0282499 A1* | 10/2015 | Lagache | ................. | A23G 3/42 |
| | | | | 426/578 |

FOREIGN PATENT DOCUMENTS

| | | | | | |
|---|---|---|---|---|---|
| EP | 1023841 | A1 | 9/2006 | | |
| RU | 2169485 | C1 | 6/2001 | | |
| WO | 1993018660 | A1 | 9/1993 | | |
| WO | WO9318660 | A1 | 9/1993 | | |
| WO | WO2014110584 | A1 | 7/2014 | | |
| WO | WO-2015170983 | A1 * | 11/2015 | ............... | A23G 3/42 |
| WO | 2017059352 | A1 | 4/2017 | | |
| WO | WO2017059352 | A1 | 4/2017 | | |

* cited by examiner

CHEWY CONFECTIONERY PRODUCT

FIELD OF THE DISCLOSURE

The present disclosure is directed to chewy confectionery products. More specifically, the present disclosure is directed to uncoated chewy confectionery products comprising starch as a hydrocolloid, sucrose, and a glucose syrup. The uncoated chewy confectionery products are shape stable, shelf stable, and less sticky than traditional chewy confectionery products. Advantageously, the chewy confectionery products of the present disclosure have a texture similar to traditional chewy confectionery products, but do not require a protective coating or wrapper to maintain their stability.

BACKGROUND OF THE DISCLOSURE

Chewy confectionery products are typically made with sucrose, glucose syrup, and a texturizing agent, such as gelatin, egg white (albumin), starch, or pectin, which is added to provide a desirable chewy texture. A fat is also commonly added to such chewy confectionery products to help achieve desired chew characteristics. Chewy confectionery products are traditionally prepared by mixing together and cooking the sucrose and glucose syrup, with the texturizing agent and fat being added either before or after cooking. The product is then cooled, extruded, and further cooled before final processing.

The shape and shelf life stability of a chewy confectionery product may be affected by a variety of factors, including the hydrocolloid (e.g., a texturizing agent) type and/or moisture level in the product. The crystalline matrix formed by the sucrose present in chewy confectionery products may also affect the shape and shelf life stability of the products. Following cooking, the sucrose molecules present in a chewy confectionery material form a crystalline matrix upon cooling, which stabilizes the candy shape by locking non-sucrose molecules within this matrix. Since traditional methods of preparing chewy confectionery products result in a slow crystallization process, a significant amount of sucrose present in the confectionery material is not crystallized at the time of candy formation. Rather, chewy confectionery products prepared by traditional methods are in a semi-crystalline/semi-amorphous phase when formed, and require several days of storage after forming before crystallization is complete. Chewy confectionery products produced by traditional methods have been found to be unstable (e.g., to exhibit cold flow) and/or to stick to one another when packaged if not covered with an individual wrapper or an applied outer coating or shell (e.g., shellac). Although some texturizing agents, such as pectin, may help stabilize the shape of the confectionery product after forming without the need for a wrapper, a further surface protection (e.g., shellac coating) is still needed to help limit sticking (e.g., to prevent confectionery products from sticking together).

It would thus be desirable to produce a chewy confectionery product that does not require an individual wrapper or a surface coating to maintain stability of the confectionery product.

BRIEF DESCRIPTION OF THE DISCLOSURE

The present disclosure is directed to chewy confectionery products. More specifically, the present disclosure is directed to uncoated chewy confectionery products comprising starch as a hydrocolloid, sucrose, and a glucose syrup. The uncoated chewy confectionery products are shape stable, shelf stable, and less sticky than traditional chewy confectionery products. Advantageously, the chewy confectionery products of the present disclosure have a texture similar to traditional chewy confectionery products, but do not require a protective coating or wrapper to maintain their stability.

In one embodiment, the present disclosure is directed to a stable chewy confectionery product comprising starch and a sweetener comprising sucrose and a glucose syrup, wherein the sucrose to glucose ratio in the stable chewy confectionery product is from about 75:25 to about 55:45, wherein the stable chewy confectionery product has a weight of about 4 g or less, and wherein the stable chewy confectionery product is uncoated and unwrapped.

In one embodiment, the stable chewy confectionery product comprises the sweetener in an amount of at least 80% by weight on a dry basis of the stable chewy confectionery product; starch in an amount of from about 0.2% to about 10% by weight on a dry basis of the stable chewy confectionery product; and a water content of about 4.5% to about 6.5% by weight of the stable chewy confectionery product; wherein the sucrose to glucose ratio in the stable chewy confectionery product is from about 70:30 to about 60:40, and the stable chewy confectionery product has a weight of about 2.5 g or less.

In another embodiment, the disclosure is directed to a process for preparing a stable chewy confectionery product, the process comprising: cooking a raw syrup comprising sucrose, a glucose syrup, and starch to a temperature of from about 115° C. to about 145° C. to produce a cooked candy syrup; applying shear force and cooling the cooked candy syrup to a temperature of about 105° C. to about 120° C. at a cooling rate of about 2° C./minute to about 8° C./minute in a first device to produce an oversaturated sucrose solution; applying shear force and cooling the oversaturated sucrose solution to a temperature of about 60° C. to about 105° C. at a cooling rate of about 2° C./minute to about 8° C./minute in a second device to produce a confectionery mass; holding the confectionery mass in a holding tank for about 0 minutes to about 60 minutes; and forming the confectionery mass into the stable chewy confectionery product.

In another embodiment, the disclosure is directed to a stable chewy confectionery product comprising sucrose, glucose, and starch, wherein the stable chewy confectionery product is prepared by a process of the present disclosure.

In one such embodiment, the stable chewy confectionery product comprises a sweetener in an amount of at least 80% by weight on a dry basis of the stable chewy confectionery product, wherein the sweetener comprises sucrose and a glucose syrup; starch in an amount of from about 0.2% to about 10% by weight on a dry basis of the stable chewy confectionery product, and a water content of about 4.5% to about 6.5% by weight of the stable chewy confectionery product, wherein the sucrose to glucose ratio in the stable chewy confectionery product is from about 75:25 to about 55:45, the stable chewy confectionery product has a weight of about 4 g or less, and the stable chewy confectionery product is uncoated and unwrapped.

BRIEF DESCRIPTION OF THE DRAWINGS

FIG. 3A depicts the product samples in the storage bin; FIGS. 3B and 3C depict product samples taken from the bottom of the bin after storage for 3 months.

DETAILED DESCRIPTION OF THE DISCLOSURE

Figure 1:
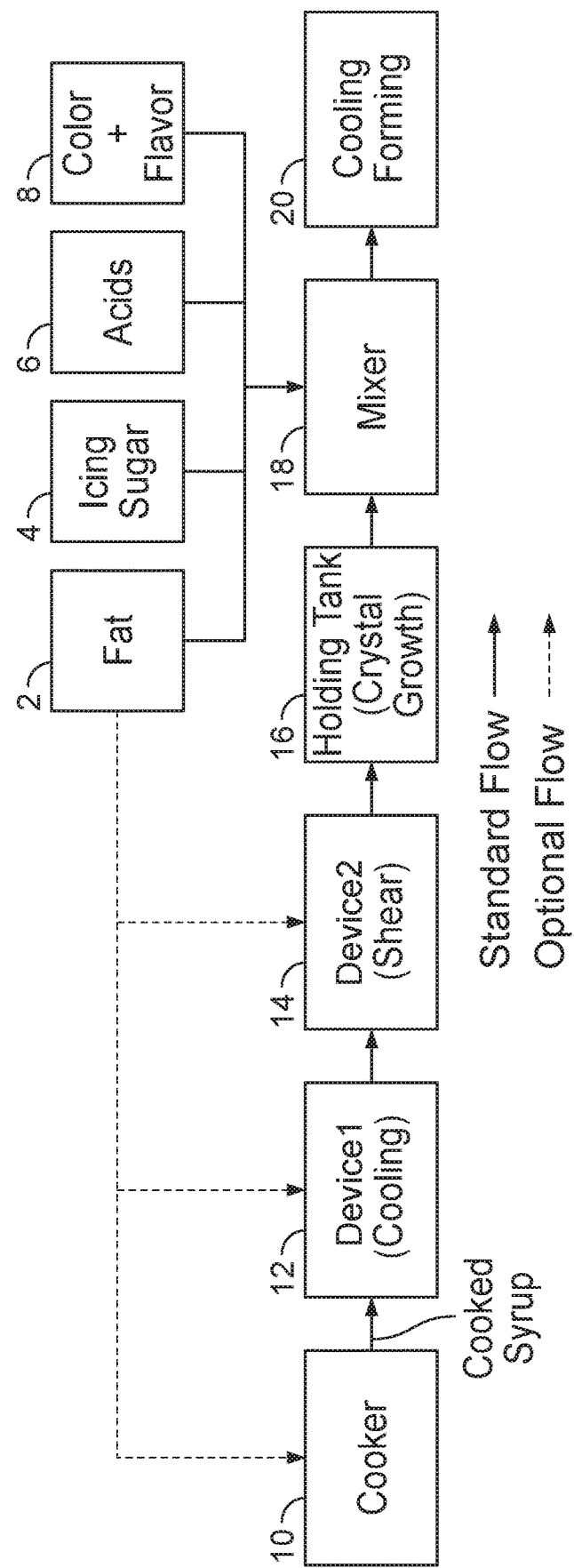
FIG. 1 is a flow chart depicting a process used to prepare the chewy confectionery products of the present disclosure.

The present disclosure is directed to chewy confectionery products. More specifically, the present disclosure is directed to stable uncoated chewy confectionery products comprising starch as a hydrocolloid, sucrose, and a glucose syrup. The uncoated chewy confectionery products are shape stable, shelf stable, and less sticky than traditional chewy confectionery products. Advantageously, the chewy confectionery products of the present disclosure have a texture similar to traditional chewy confectionery products, but do not require a protective coating or wrapper to maintain their stability (i.e., are uncoated and unwrapped).

Rapidly cooling a chewy confectionery material after cooking, in combination with application of shear force (e.g., mechanical shear force), increases the speed of nucleation and sucrose crystallization. Specifically, rapid cooling and application of shear force results in formation of large quantities of small crystals in the confectionery material, and rapid crystallization of the sucrose. As a result, a greater proportion of the sucrose present in the confectionery material is crystallized at the time the chewy confectionery product (e.g., candy pieces) are formed, as compared to traditional methods of producing chewy confectionery products, and the resulting chewy confectionery products are more stable. Advantageously, chewy confectionery products produced by such a process are shape and shelf life stable, and do not require a protective coating or wrapper to maintain their stability.

Additionally, the ratio of sucrose to glucose present in a chewy confectionery product may impact crystallization of the confectionery material. In particular, the chewy confectionery products of the present disclosure contain high levels of sucrose, and a higher ratio of sucrose, as compared to glucose on a dry basis, which enables easier sucrose crystallization during the production process.

Definitions

As used herein, "cold flow" refers to the distortion, deformation, or dimensional change which takes place in a material under ambient conditions and pressures with an inability to return to its original dimensions. Cold flow of the chewy confectionery products of the present disclosure may be determined by visually examining the product for movement (e.g., distortion, deformation, or dimensional change) after storage under ambient conditions for a select period of time (e.g., 7 days) after preparation of the chewy confectionery product. One example of cold flow testing is described in U.S. Patent Application No. 2014/0220188.

As used herein, "stability" refers to either shape stability or shelf life stability. A confectionery product of the present disclosure is thus "stable" if it has shape stability and/or shelf life stability.

As used herein, "shape stability" means the chewy confectionery product exhibits minimal or no cold flow under ambient storage conditions, or minimal or no surface deformation under ambient temperature and typical storage surface pressure. Shape stability may also mean the chewy confectionery product has strong standing properties.

As used herein, "shelf life stability" means the chewy confectionery product has minimal or no change in product properties after storage for at least 3 months, or at least 6 months, or at least 9 months, or at least 1 year at 25° C. and 50% relative humidity. Product properties may include, for example, texture, flavor, color, and appearance (e.g., stickiness, cold flow).

The term "tacky" or "tacky surface" or "sticky" or "stickiness" refers to a property of a chewy confectionery product, in which the surface of such product is adhesive or gummy to the touch, such that portions of such product will tend to adhere to each other (e.g., forming clusters) or to processing equipment parts such as rollers, or to packaging materials. "Substantial adhesion" means a condition in which such products join to processing equipment parts to an extent that requires stoppage or interruption in processing, which is referred to as "downtime," or adhere to each other or to packaging such that they are not easily removed or broken apart.

As used herein, the term "unwrapped" means an individual chewy confectionery product of the present disclosure is not individually wrapped, e.g., in a conventional candy wrapper. An "unwrapped" chewy confectionery product of the present disclosure could, however, be packaged along with other unwrapped chewy confectionery products in conventional packaging materials.

In one embodiment, the chewy confectionery products of the present disclosure comprise starch, sucrose, and a glucose syrup. The chewy confectionery products have a cohesive nature under normal room conditions. The chewy confectionery products may further comprise water, fat, icing sugar, foaming agents, humectants, artificial and natural sweeteners, emulsifiers, flavor enhancers, acids, essential oils, artificial or natural flavorings, colorings, fruit juices, vegetable juices, proteins, and other additives typically used in the production of chewy confectionery products as desired. Examples of chewy confectionery products include chewy candy, toffee, gummies, and taffy.

The chewy confectionery products of the present disclosure comprise a sweetener. More particularly, the chewy confectionery products comprise a combination of sweeteners, such as sucrose and a glucose syrup. In one embodiment, the total amount of sweetener present in the chewy confectionery products is at least 75% by weight on a dry basis of the chewy confectionery product, or at least 80% by weight on a dry basis of the chewy confectionery product, or at least 90% by weight on a dry basis of the chewy confectionery product, or at least 95% by weight on a dry basis of the chewy confectionery product. In one embodiment, the total amount of sweetener present in the chewy confectionery products is about 80% to about 95% by weight on a dry basis of the chewy confectionery product, or about 80% to about 90% by weight on a dry basis of the chewy confectionery product, or about 80% to about 85% by weight on a dry basis of the chewy confectionery product, or about 80% by weight on a dry basis of the chewy confectionery product, or about 85% by weight on a dry basis of the chewy confectionery product, or about 90% by weight on a dry basis of the chewy confectionery product.

In one particular embodiment, the sweetener comprises sucrose and a glucose syrup. Examples of suitable glucose syrups for use in the chewy confectionery products of the present disclosure include corn syrup, rice syrup, high maltose syrup, high fructose syrup, potato syrup, and the like. In one embodiment, the sucrose is granulated sucrose. In another embodiment, the sweetener optionally includes icing sugar. For instance, in some embodiments, icing sugar may optionally be added to the confectionery mass as a seeding agent to assist with nucleation, and promote crystallization of the confectionery mass. The icing sugar used in the confectionery products described herein may be milled, powdered sucrose, having a particle size of from about 150 µm to about 200 µm. The icing sugar may be present in the chewy confectionery products in an amount of from about 0% to 20% by weight on a dry basis of the chewy confectionery product, more preferably from about 0% to about 10% by weight on a dry basis of the confectionery product, or from about 0% to about 3% by weight on a dry basis of the confectionery product, or from about 2% to about 3% by weight on a dry basis of the confectionery product. In some embodiments, the rapid cooling and application of shear force to the confectionery material results in sufficient nucleation to promote rapid crystallization of the sucrose in the confectionery product. In such embodiments, the addition of icing sugar to the confectionery material is not necessary. Thus, in one embodiment, the chewy confectionery products do not comprise any icing sugar (i.e., are free of icing sugar).

In some embodiments, the chewy confectionery products of the present disclosure optionally may further comprise an additional sweetener other than sucrose (e.g., granulated sucrose and optionally icing sugar) and glucose syrup. The additional sweetener may include, but is not limited to, any of a number of carbohydrates commonly found in confectionery products. Examples include various sugars, for example, monosaccharaides and disaccharides such as glucose, fructose, dextrose, maltose, lactose, etc. and their polymers. If present, an additional sweetener other than sucrose (e.g., granulated sucrose and optionally icing sugar) and glucose syrup, may be present in the chewy confectionery product in an amount of about 5% or less by weight on a dry basis of the chewy confectionery product, or about 3% or less by weight on a dry basis of the chewy confectionery product, or about 2% or less by weight on a dry basis of the chewy confectionery product, or about 1% or less by weight on a dry basis of the chewy confectionery product, or about 0.5% or less by weight on a dry basis of the chewy confectionery product. In one embodiment, the chewy confectionery product of the present disclosure does not comprise any sweetener other than sucrose (e.g., granulated sucrose and/or icing sugar) and glucose syrup (i.e., is free of additional sweeteners).

The ratio of sucrose to glucose present in the chewy confectionery products may impact crystallization of the confectionery material. In particular, the chewy confectionery products of the present disclosure contain high levels of sucrose, and a higher ratio of sucrose, as compared to glucose on a dry basis, which enables easier sucrose crystallization during the production process.

Thus, in one embodiment, about 55% to 75% by weight of the total amount of sucrose and glucose in the confectionery product, on a dry basis, is sucrose, and preferably from about 60% to about 70% by weight of the total amount of sucrose and glucose in the confectionery product on a dry basis is sucrose. In one embodiment, about 25% to about 45% by weight of the total amount of sucrose and glucose in the confectionery product on a dry basis is glucose, and preferably from about 30% to about 40% by weight of the total amount of sucrose and glucose in the confectionery product on a dry basis is glucose. The chewy confectionery products of the present disclosure thus preferably have a sucrose:glucose ratio of from about 75:25 to about 55:45, and preferably from about 70:30 to about 60:40. In one embodiment, the sucrose:glucose ratio is about 65:35. As used herein, the term "sucrose:glucose ratio" or "sucrose to glucose ratio" refers to a ratio of the weight percent of the total amount of sucrose and glucose in the chewy confectionery product that is sucrose to the weight percent of the total amount of sucrose and glucose in the chewy confectionery product that is glucose, on a dry basis. The sucrose:glucose ratio is calculated using all sources of sucrose and glucose present in the chewy confectionery product including granulated sucrose, icing sugar, glucose syrups, and any other sources of glucose. When the amount of sucrose present in the chewy confectionery product is higher than about 75% of the total amount of sucrose and glucose on a dry basis, the products may become less chewy, whereas when the proportion of glucose in the chewy confectionery product is higher than about 45% of the total amount of sucrose and glucose on a dry basis, the stability of the product's texture and shape may be reduced (e.g., the product may exhibit increased stickiness and cold flow).

In one particular embodiment, at least 80%, or at least 85%, or at least 90% of the sucrose present in the chewy confectionery products of the present disclosure is crystallized.

The chewy confectionery products of the present disclosure further comprise a hydrocolloid. Hydrocolloids suitable for use in chewy confectionery products include, but are not limited to, starch, gelatin, pectin, egg white, agar, gellan, alginates, sodium alginate, calcium alginate, carrageenans, guar gum, locust gum, tara gum, gum arabic, ghatti gum, xanthan gum, tamarind gum, and the like. In one particular embodiment, the chewy confectionery products of the present disclosure include starch as a hydrocolloid. The starch may act as a gelling agent, assisting in achieving the desired texture of the confectionery product. Both modified and unmodified starches may be used as the hydrocolloid. Starch comprises long polymers of glucose (a.k.a. dextrose) units that are arranged into discrete, highly organized, semi-crystalline aggregates called "starch granules". These starch polymers within the "granule" are either straight-chain/linear (amylose) or highly branched (amylopectin). Starches vary by source in their amylopectin-to-amylose ratios.

When a starch is gelatinized the crystalline structure of the granules is lost, and the granules begin to swell/take up water/increase in size and increase the viscosity of the aqueous system and fully cook out in the candy-making process to the point where the granules lose integrity/fragment/rupture. As this cooked starch cools, the solubilized straight-chain amylose polymers re-align tightly to form a gel (a process known as retrogradation). The higher the amylose content in the starch, the stronger the resulting gel; the high amylose corn starches form much stronger and much more rapidly setting gels versus starches containing less amylose.

Advantageously, starch can be used in the chewy confectionery products of the present disclosure to replace or complement more expensive and/or harder-to-source ingredients such as gelatin or gum arabic, which may be present in traditional chewy confectionery products. Starch can help to modify the chew characteristics of the confectionery product (e.g., increasing the structure/body, softness, chewiness, and elasticity of the candy while reducing "toothstick").

An additional advantage of using starch as the hydrocolloid in chewy confectionery products is that it allows one to control the viscosity of the confectionery material during production, which helps with control of subsequent cold flow during storage. Additionally, traditional texturizing agents like egg white and gelatin are animal derived ingredients, and thus are undesirable to the vegetarian population, as well as for ethnic groups with concerns about the nature of meat used in certain food products and/or who observe certain dietary constraints concerning the consumption of meat and dairy products. The use of starch as a hydrocolloid, instead of such traditional texturizing agents, eliminates the use of animal products in the chewy confectionery product.

In spite of these advantages, previous attempts to use starch as a hydrocolloid in chewy confectionery products has resulted in products that exhibit cold flow and/or which require an individual wrapper or protective outer coating to maintain stability.

It has now been discovered that starch-containing chewy confectionery products, when produced by the methods described herein, have shape stability (e.g., do not exhibit cold flow over at least a 3 month period, or a 6 month period, or a 9 month period, or a 12 month period, or longer) and shelf life stability, and are not sticky and do not require a protective coating or wrapper to maintain their stability.

The starch may be present in the chewy confectionery products in an amount of at least 0.2% by weight on a dry basis of the chewy confectionery product, and preferably from about 0.2% to about 10% by weight on a dry basis of the chewy confectionery product, more preferably from about 0.5% to about 5% by weight on a dry basis of the chewy confectionery product, or from about 0.5% to about 1% by weight on a dry basis of the chewy confectionery product, or from about 0.6% to about 0.9% by weight on a dry basis of the chewy confectionery product. In one embodiment, the starch is a mixture of water soluble starches. In one embodiment, the chewy confectionery product is substantially free of other hydrocolloids (i.e., it has no intentional addition of gelatin, pectin, egg white, agar, and/or gellan, etc., or the amount of gelatin, pectin, egg white, agar, and/or gellan, etc. does not contribute to the chewy consistency of the product). In another embodiment, the chewy confectionery product contains additional hydrocolloids, which help with the desired final consistency and texture of the product (e.g., it contains gelatin, pectin, agar, and/or gellan, etc.).

The fat used in the chewy confectionery products may include, but is not limited to, any of a number of fats commonly used in confectionery products. Examples of such fats include, but are not limited to, shea butter fat, dairy fats, modified and unmodified palm oil, palm kernel oil, coconut oil, soybean oil, and cottonseed oil. The fat may be present in the chewy confectionery products in an amount of from about 0% to about 15% by weight on a dry basis of the chewy confectionery product, preferably from about 3% to about 8% by weight on a dry basis of the chewy confectionery product, or from about 4% to about 7% by weight on a dry basis of the chewy confectionery product, or from about 5% to about 7% by weight on a dry basis of the chewy confectionery product. The type and amount of fat included in the chewy confectionery product may affect the viscosity of the product during processing. For example, the softer the fat and the greater the quantity of fat, the lower the viscosity of the confectionery mass during production.

In one embodiment, the chewy confectionery products may optionally further comprise an acid. Any food grade acid may be used including, but not limited to, citric acid (e.g., citric acid monohydrate), tartaric acid, acetic acid, lactic acid, malic acid, phosphoric acid, and the like. The acid may be present in the chewy confectionery products in an amount of from about 0% to about 10% by weight on a dry basis of the chewy confectionery product, preferably from about 0% to about 3% by weight on a dry basis of the chewy confectionery product, or from about 1% to about 3% by weight on a dry basis of the chewy confectionery product, or from about 1% to about 2% by weight on a dry basis of the chewy confectionery product.

In one embodiment, the chewy confectionery product may optionally further comprise colors and/or flavors. Any color or flavor suitable for use in confectionery products may be used. Flavor chemicals are commonly liquid organic solutions that normally contain a variety of constituents varying in chemical class, as well as physical and chemical characteristics. Although most flavors are water insoluble liquids, water soluble liquids and solids are also known. These flavors may be natural or artificial (synthetic) in origin. Often natural and artificial flavors are combined. It is also common to blend different flavors together in pleasing combinations. Although the range of flavors usable in confectionery products is nearly limitless, they commonly fall into several broad categories. Fruit flavors include, but are not limited to, lemon, orange, lime, grapefruit, tangerine, strawberry, apple, cherry, raspberry, blackberry, blueberry, banana, pineapple, cantaloupe, muskmelon, watermelon, grape, currant, mango, kiwi and many others as well as combinations thereof. Mint flavors include spearmint, peppermint, wintergreen, basil, corn mint, menthol and others and mixtures thereof. Spice flavors include cinnamon, vanilla, clove, chocolate, nutmeg, coffee, licorice, eucalyptus, ginger, cardamom and many others. Also used are herbal and savory flavors such as popcorn, chili, corn chip and the like. In one particular embodiment, the flavor is an oil (i.e., a flavor oil). The flavor oil may be an essential oil, a synthetic flavor, or mixtures thereof. Examples of suitable flavor oils include, but are not limited to, oils derived from plants and fruits, such as citrus oils (e.g. orange oils), fruit essences, peppermint oil, spearmint oil, *eucalyptus*, other mint oils, clove oil, oil of wintergreen, cinnamic aldehyde, anise, spice flavors, terpenes, and combinations thereof.

The color and/or flavor may be present in the chewy confectionery products in an amount of from about 0% to about 10% by weight on a dry basis of the chewy confectionery product, preferably from about 0% to about 5% by weight on a dry basis of the chewy confectionery product, or from about 1% to about 3% by weight on a dry basis of the chewy confectionery product, or from about 1% to about 2% by weight on a dry basis of the chewy confectionery product.

According to an embodiment of the present invention the chewy confectionery product has a water content of from about 4.5% to about 6.5% by weight of the chewy confectionery product, preferably, from about 5% to about 6% by weight of the chewy confectionery product, and most preferably about 5.5% or 5.7% by weight of the chewy confectionery product. In this regard, it is to be noted that in general, as water content decreases, the chewy confectionery product becomes harder and less chewy. In contrast, as the water content increases, the product can become too soft and sticky, and suffer from stability issues.

In another embodiment, the chewy confectionery product may also include one or more additional ingredients traditionally used in the confectionery industry. These ingredients include, but are not limited to, other hydrocolloids (such as gum arabic, xanthine gum, locust bean gum, gellan gum, and carrageenan), acidulants, sensates, buffering agents, humectants, artificial and natural sweeteners, sugar alcohols, emulsifiers, flavor enhancers, proteins, essential oils, fruit juices, vegetable juices, vitamins, supplements, diary (such as evaporated milk, concentrated milk, dry milk, whey, butter, cream, yogurt, buttermilk, etc.), fiber, nuts, cereal, cocoa derivatives (e.g., cocoa powder, cocoa liquor, flavanols, etc.), colorings, and other commonly used confectionery ingredients. The additional ingredients may be present in the chewy confectionery product of the current invention in an amount of up to 50% by weight on a dry basis of the chewy confectionery product, more preferably up to 20% by weight on a dry basis of the chewy confectionery product.

In one embodiment, the chewy confectionery product may be center-filled with a liquid, syrup, or powder. The center filling may contain vitamins, supplements, nutritional ingredients, minerals, herbal extracts, oligosaccharides and the like. Such center filling could also include chocolate and other forms of confectionery products. In one embodiment, the chewy confectionery product may also contain a high intensity sweetener, natural or artificial sweetener, sugar alcohol, or other sugar substitute in place of all or part of its sucrose or glucose syrup.

It has been observed that the texture of chewy confectionery products produced by the processes described herein become harder and more difficult to chew as the size of the product increased. In contrast, when the size of the confectionery product is kept small, the texture of the product is soft and easy to chew, while maintaining its non-sticky properties. Thus, in one embodiment, the chewy confectionery product of the present disclosure has a weight of about 4 g or less, and preferably about 2.5 g or less or about 2 g or less. In one embodiment, the chewy confectionery product has a weight of from about 0.5 g to 4 g, or from about 1 g to about 2.5 g, or from about 1 g to about 2 g, or about 1.5 g.

The chewy confectionery products of the present disclosure advantageously do not require a coating or an individual wrapper to maintain their stability (i.e., they may be packaged uncoated and unwrapped). Rapidly cooling a chewy confectionery material after cooking, in combination with application of shear force (e.g., mechanical shear force), increases the speed of nucleation and sucrose crystallization. Specifically, rapid cooling and application of shear force results in formation of large quantities of small crystals in the confectionery material, and rapid crystallization of the sucrose. As a result, a greater proportion of the sucrose present in the confectionery material is crystallized at the time the confectionery products (e.g., candy pieces) are formed, as compared to traditional methods of producing chewy confectionery products, and the resulting confectionery products are more stable. Advantageously, chewy confectionery products produced by such a process are not sticky, and are shape and shelf life stable, and do not require a protective coating or wrapper to maintain their stability (i.e., may be packaged uncoated and unwrapped).

Thus, in one aspect, the present disclosure is directed to a process for preparing a stable chewy confectionery product. The process comprises: cooking a raw syrup comprising sucrose, a glucose syrup, and starch to a temperature of from about 115° C. to about 145° C. to produce a cooked candy syrup; applying shear force and rapidly cooling the cooked candy syrup to a temperature of about 60° C. to about 120° C. in one or more devices to produce a confectionery mass; holding the confectionery mass in a holding tank for about 0 minutes to about 60 minutes; and forming the confectionery mass into the stable chewy confectionery product.

In one specific embodiment, the present disclosure is directed to a process for preparing a stable chewy confectionery product comprising: cooking a raw syrup comprising sucrose, a glucose syrup, and starch to a temperature of about 115° C. to about 145° C. to produce a cooked candy syrup; applying shear force and rapidly cooling the cooked candy syrup to a temperature of about 105° C. to about 120° C. in a first device to produce an oversaturated sucrose solution; applying shear force and rapidly cooling the oversaturated sucrose solution to a temperature of about 60° C. to about 105° C. in a second device to produce a confectionery mass; holding the confectionery mass in a holding tank for about 0 minutes to about 60 minutes; and forming the confectionery mass into the stable chewy confectionery product. In one embodiment, about 80% to about 90% of the sucrose present in the confectionery mass is crystallized prior to forming.

One suitable process for preparing a stable chewy confectionery product of the present disclosure is illustrated in FIG. 1.

More specifically, cooked candy syrup (also referred to herein as cooked syrup) is prepared by mixing together the sweetener, specifically the sucrose and glucose syrup, and the hydrocolloid (e.g., starch) to form a raw syrup (also referred to herein as a candy syrup). The mixer used may be a continuous or batch mixer. Following mixing, the raw syrup is cooked in either a continuous or batch cooker (10) to a temperature of from about 115° C. to about 145° C., more preferably from about 125° C. to about 135° C., and in one embodiment, to a temperature of about 120° C. to produce the cooked candy syrup. At cooking temperatures above 145° C., the final product may be too hard and brittle, and lose its chewy texture. At cooking temperatures below 115° C., the final product may be too soft and sticky, and fail to keep the product shape. Optionally, vapor from the cooked candy syrup is separated by use of a vacuum chamber or an atmospheric flash-off chamber. The fat (2) may optionally be added to the candy syrup either before or after cooking. Depending on the equipment being used, the fat (2) may be added at any stage of the production process, and not just before or after the candy syrup is cooked.

The cooked candy syrup is discharged from the cooker (10), and is rapidly cooled and subjected to shear force (e.g., mechanical shear force). The rapid cooling and application of shear force promote rapid nucleation and crystallization of the sucrose in the cooked candy syrup, and result in formation of large quantities of small crystals, and rapid crystallization. In one embodiment, the rapid cooling is done prior to application of shear force. For instance, the rapid cooling may be done manually (e.g., on cooling tables), and prior to application of shear force. In another embodiment, the rapid cooling is done continuously using a scraped surface heat exchanger (e.g., a crystallizer). In one particular embodiment, the rapid cooling and application of shear force are done simultaneously. Simultaneous rapid cooling and application of shear force may occur in any device suitable for cooling and application of shear force to a cooked candy syrup.

The cooked candy syrup may be rapidly cooled to a temperature of from about 60° C. to about 120° C., or about 90° C. to about 120° C., or from about 105° C. to about 120° C., or from about 105° C. to about 115° C., or from about 105° C. to about 110° C. Typically, the rapid cooling is done at a cooling rate of from about 2° C./minute to about 8° C./minute, or from about 6° C./minute to about 8° C./minute, or from about 4° C./minute to about 6° C./minute. In one embodiment, the cooling is done at a cooling rate of about 5° C./minute. In one particular embodiment, the cooked candy syrup is at a temperature of about 120° C. upon exiting the cooker (10), and is cooled to a temperature of about 105° C. In another embodiment, the cooked candy syrup is at a temperature of about 120° C. upon exiting the cooker (10), and is cooled to a temperature of about 110° C. In one particular embodiment, the cooked candy syrup is at a temperature of about 120° C. upon exiting the cooker (10) and is cooled to a temperature of about 105° C. to 110° C. within about 3 minutes. By rapidly cooling the cooked candy syrup to these temperatures, an oversaturated sucrose solution is produced.

In one particular embodiment, the cooked candy syrup is discharged from the cooker (10), and rapidly cooled in a first (cooling) device (12) to produce an oversaturated sucrose solution. The cooling device (12) may be any device capable of rapidly cooling a cooked candy syrup at a cooling rate of about 2° C./minute to about 8° C./minute, or from about 6° C./minute to about 8° C./minute, or from about 4° C./minute to about 6° C./minute, or at a cooling rate of about 5° C./minute. In one embodiment, the cooling device (12) also applies mechanical shear force to the cooked candy syrup. In one particular embodiment, the cooling device (12) may comprise a cooling jacket (e.g., an annular water jacket) surrounding the device, and fan-shaped impeller blades within the device, which rapidly cool the cooked candy syrup while also subjecting the cooked candy syrup to mechanical shear. In one embodiment, the cooked candy syrup is cooled to a temperature of about 105° C. to about 120° C., or about 105° C. to about 115° C., or about 105° C. to about 110° C. in the cooling device (12). The oversaturated sucrose solution may thus be at a temperature of about 105° C. to about 120° C., or about 105° C. to about 115° C., or about 105° C. to about 110° C. upon exiting the cooling device (12).

Upon exiting the cooling device (12), the oversaturated sucrose solution may be run through a second (shear) device (14), which applies additional mechanical shear force to the oversaturated sucrose solution, to produce a confectionery mass. In one embodiment, the shear device (14) also further cools the oversaturated sucrose solution. In one embodiment, the shear device (14) cools the oversaturated sucrose solution to a temperature of about 60° C. to about 105° C., or about 70° C. to about 105° C., or about 80° C. to about 105° C., or about 90° C. to about 105° C., or to a temperature of about 90° C. In one embodiment, the fat (2) is optionally added to the oversaturated sucrose solution prior to running it through the shear device (14). The shear device (14) may be any confectionery device capable of cooling and applying shear force to a sucrose solution. In certain embodiments, the shear device (14) may be a fondant beater, a pin beater, or a scraped surface heat exchanger. In one embodiment, the shear device (14) is capable of applying mechanical shear force and rapidly cooling a confectionery mass at a cooling rate of about 2° C./minute to about 8° C./minute, or from about 6° C./minute to about 8° C./minute, or from about 4° C./minute to about 6° C./minute, or at a cooling rate of about 5° C./minute. In one embodiment, the shear device (14) is a continuous device, and comprises a rotator and stator controlled by a water circuit. The water circuit may be at a temperature of from about 50° C. to about 80° C., or from about 60° C. to about 70° C. In other embodiments, the shear device (14) is a batch mixer. In one embodiment, the confectionery mass is at a temperature of about 60° C. to about 105° C., or about 90° C. to about 105° C., or about 90° C. upon exiting the shear device (14).

Thus, in one particular embodiment, the process of the present disclosure employs the use of two devices in series to initiate and promote crystallization of the sucrose. The first (cooling) device (12) rapidly cools the cooked candy syrup to a temperature of 105° C. to about 120° C., or from about 105° C. to about 115° C., while applying shear force, to produce an oversaturated sucrose solution. The second (shear) device (14) further cools the oversaturated sucrose solution, e.g., to a temperature of about 60° C. to about 105° C., or about 90° C. to about 105° C., or more particularly to about 90° C., while also applying shear force. The rapid cooling and application of shear force to the cooked candy syrup initiates nucleation of sucrose crystals, and results in significant crystallization of the sucrose present in the cooked candy syrup. Once crystallization of the sucrose has begun, the further application of shear force to the cooked candy syrup and/or to the oversaturated sucrose solution results in formation of additional crystal nuclei. Without wishing to be bound to any particular theory, application of shear force to the cooked candy syrup and/or to the oversaturated sucrose solution may result in small crystal nuclei being sheared off of a growing crystal, thus increasing the number of crystals in the cooked candy syrup and/or the oversaturated sucrose solution. Consequently, upon exiting the shear device (14) the majority of the sucrose present in the resulting confectionery mass has crystallized. In one embodiment, upon exiting the shear device (14), at least 60%, or at least 70%, or at least 80%, or more of the sucrose present in the confectionery mass has crystallized. In one embodiment, upon exiting the shear device (14), about 80% of the sucrose present in the confectionery mass has crystallized.

Thus, in one particular embodiment, crystallization is initiated and primarily occurs in a two-step crystallization system comprising a first (cooling) device that produces a super (over) saturated sucrose solution in series with a second (shear) device, which provides further cooling and shear force. In one particular embodiment, the first device imparts a first amount of shear force to the cooked candy syrup, and the second device imparts a second amount of shear force to the oversaturated sucrose solution. In one embodiment, the second amount of shear force is greater than the first amount of shear force.

The first (cooling) (12) and second (shear) (14) devices may be of the same or different configurations, and may be any device suitable for simultaneously cooling and applying shear force to a cooked candy syrup and/or to an oversaturated sucrose solution. In one embodiment, the cooling device (12) and/or the shear device (14) may comprise a tank with a mixer for internal circulation, and a cooling means. The mixer present in the internal cavity of the tank may be of any configuration suitable to impart shear force to the cooked candy syrup and/or to the oversaturated sucrose solution. In one embodiment, the mixer present in the internal cavity of the cooling device (12) and/or the shear device (14) may comprise a rotator and stator, fan-shaped impeller blades, a screw conveyor and/or disks that rotate on a longitudinal axis. The cooling device (12) and/or the shear device (14) may comprise as a cooling means a cooling jacket (e.g., an annular water jacket) surrounding the device through which cooled water or a refrigerating fluid is circulated. In some embodiments, the impeller blades, screw conveyor, and/or disks present in the device may be hollow, and cooled water or a refrigerating fluid may be circulated through these mixers to assist with cooling. Thus, in some embodiments, the temperature decrease (cooling) may occur by way of heat exchange with an intermediate fluid circulating in a jacket or through hollow portions of the mixer. Without wishing to be bound to any particular theory, it is believed that sucrose crystals precipitate on the cold surfaces of the screws/discs/blades present in the devices (12, 14), and are removed by scrapers. The screws/discs/blades may also serve to push the oversaturated sucrose solution and/or confectionery mass towards a discharge port.

As discussed herein, the cooling device (12) and the shear device (14) apply sufficient shear and cooling to the cooked candy syrup and/or to the oversaturated sucrose solution to promote nucleation and rapid crystallization of the sucrose. In one embodiment, the sucrose crystals produced by the rapid cooling and shear force that occurs in the cooling device (12) and/or the shear device (14) may have a size of about 30 μm or less, or about 25 μm or less, or about 20 μm or less, or about 15 μm or less. In one embodiment, the sucrose crystals produced by the cooling device (12) and/or the shear device (14) may have a size of about 15 μm to about 30 μm, or about 20 μm to about 30 μm, or about 20 μm.

Upon exiting the device (14), the confectionery mass may optionally be held in a holding tank (16) to allow for crystal growth and further crystallization of the sucrose prior to product forming. The confectionery mass may be held in the holding tank (16) for from 0 minutes to about 60 minutes, or from about 5 minutes to about 15 minutes. While in the holding tank, the temperature of the confectionery mass may remain unchanged, or in some embodiments, may decrease by approximately 5° C. to 15° C. In one embodiment, the confectionery mass is agitated while in the holding tank (16). Optionally, in one embodiment, about 80% to 100%, and more typically, about 80% to 90% of the sucrose present in the confectionery mass is crystallized upon exiting the holding tank (16).

Upon exiting the holding tank (16), the confectionery mass may be mixed with other formulation components in a mixer (18). Examples of suitable components are selected from the group consisting of fat (2), flavor and color (8), acids (6), icing sugar (4), etc., and combinations thereof. Icing sugar (4) may optionally be added at this stage to further promote crystallization. Any conventional continuous or batch mixer or kneading machine may be used to mix the fat, flavor, color, acid, icing sugar, etc. into the confectionery mass. The confectionery mass may then be cooled and formed (20) into the chewy confectionery product. Specifically, in one embodiment, the confectionery mass may be cooled, extruded, and further cooled, before individual pieces of the confectionery product are scored, broken up, and packaged into appropriate packaging for distribution. As previously discussed, the chewy confectionery product of the current disclosure is stable and does not need individual wrapping or a protective coating (e.g., a shellac coating) due to its physical properties that prevent the individual pieces of product from sticking together in a package. Thus, in one embodiment, the stable chewy confectionery product is uncoated and unwrapped, and may be further packaged using any conventional packaging material.

Processes for further cooling and forming (20) a chewy confectionery product are known in the art. In one embodiment, upon exiting the mixer, the confectionery mass is cooled using any conventional means including, but not limited to, a continuous cooling belt, static cooling tables, and/or contact with impingement air directed from air jets positions above and/or below a conveyor. Cooling may be controlled such as by the length of the conveyor or cooling belt, the temperature of the cooling impingement air, and the linear speed of the conveyor. The extent of cooling should be sufficient to permit the confectionery mass to pass through subsequent forming rollers without undue sticking or fouling. In one embodiment, the confectionery mass is cooled to a temperature of from about 20° C. to about 80° C., and more typically from about 30° C. to about 60° C. prior to forming. The confectionery mass may subsequently be extruded, cut, shaped, and/or formed to produce individual chewy confectionery products using any methods generally known in the art.

EXAMPLES

The disclosure may be further illustrated with reference to the following non-limiting examples.

Example 1: Chewy Confectionery Product

Chewy confectionery products were prepared as described below.

TABLE 1

Chewy Confectionery Product Ingredients

| Ingredient | Amount (% wet weight basis) | Amount (% dry weight basis) |
| --- | --- | --- |
| Sucrose (granulated) | 51.0 | 55.7 |
| Glucose syrup (46 DE) | 36.5 | 31.5 |
| Starch | 0.8 | 0.8 |
| Icing sugar (sucrose)* | 2.5 | 2.8 |
| Citric acid monohydrate | 1.5 | 1.5 |
| General purpose hard fat | 5.7 | 6.2 |
| Color and Flavor | 2.0 | 1.5 |

*milled (particle size 150-200 μm)

The chewy confectionery product was prepared by mixing the sucrose, glucose syrup, and starch, and cooking the resulting raw syrup to a temperature of about 120° C. The cooked candy syrup was run through a first (cooling) device, such as described hereinbefore, which cooled the cooked candy syrup to a temperature of 105° C., within 3 minutes, to produce an oversaturated sucrose solution. The oversaturated sucrose solution was run through a second (shear) device, such as described hereinbefore, which applied shear force and cooled the oversaturated sucrose solution to 90° C. within 3 minutes to produce a confectionery mass. Upon exiting the second device, the resulting confectionery mass was held in a holding tank for 5 to 15 minutes with mixing. Upon exiting the holding tank, the candy mass was mixed with the icing sugar, acid, fat, and colors and flavors. The colored and flavored confectionery mass was further cooled to a temperature of 30-60° C. and formed into 4 g candy pieces. The final composition of the chewy confectionery product was about 52.6 wt. % sucrose, 29.7 wt. % glucose solids, 0.7 wt. % starch, 2.6 wt. % icing sugar, 1.4 wt. % citric acid monohydrate, 5.9 wt. % fat, 1.4 wt. % colors and flavors (all dry weight), and 5.7 wt. % water. The product samples had a sucrose:glucose ratio of 65.0:35.0 on a dry weight basis.

Example 2: Shelf Life Stability—Water Activity

The shelf life stability of the chewy confectionery product prepared in Example 1 was evaluated by measuring the water activity once a month over a 12 month period using an analytical water activity meter (AquaLab 3TE, Decagon Devices, Inc.). The water activity of the Example 1 product (experimental) was compared to that of commercially available Starburst® Original Minis fruit chews (control), which contain pectin as a hydrocolloid and have a water content of about 6%. The results are set forth in FIG. 2.

Figure 2:
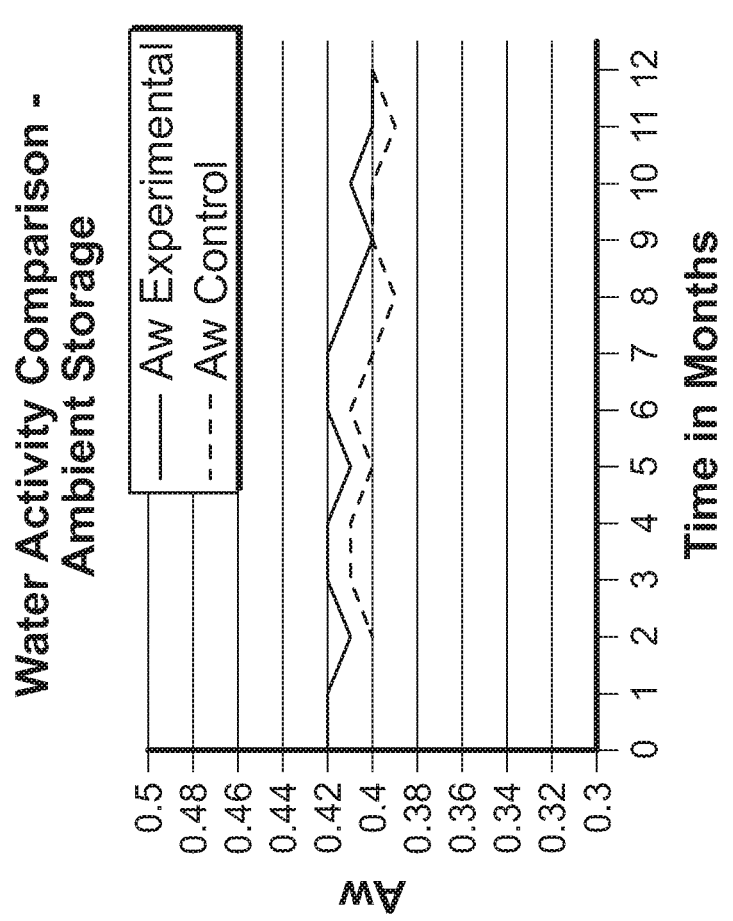
FIG. 2 is a chart showing the water activity of a chewy confectionery product of the present disclosure prepared as described in Example 1 (experimental) over 12 months, as compared to the water activity of Starburst® Original Minis fruit chews (control).

As can be seen from FIG. 2, the water activity of the Example 1 formulation followed the same trend as that of the control Starburst® Original Minis fruit chews, and was around 0.4 over a 12 month period, which is evidence of stability under ambient conditions.

Example 3: Shelf Life Stability—Resistance to Mechanical Damage Under Pressure

Figure 3A:
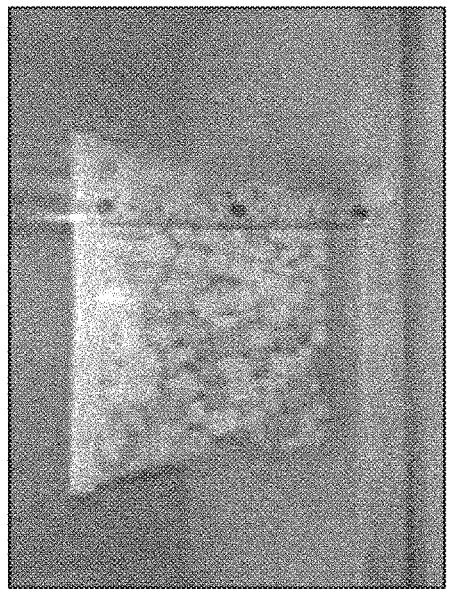
FIGS. 3A-3C depict samples of a chewy confectionery product of the present disclosure after storage under a weight load, as described in Example 3.
Figure 3B:
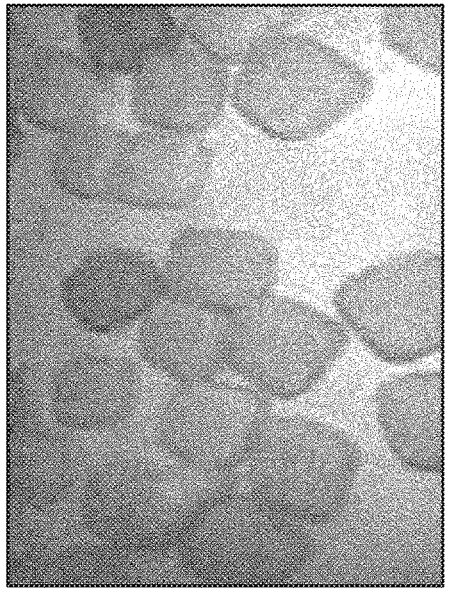
Figure 3C:
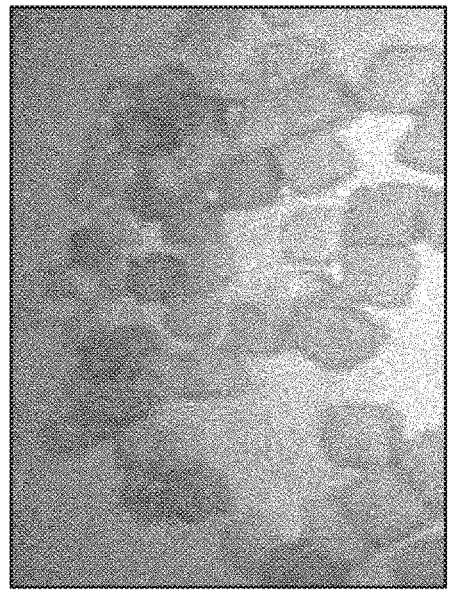

The shelf life stability of the chewy confectionery product prepared in Example 1 was evaluated by determining the product's resistance to deformation under pressure (weight load). Samples of the Example 1 product were loaded into a plastic box, and stored over a 3 month period under ambient conditions. The box had a depth of 10 cm and a weight load of 2.4 kg. The visual appearance of product samples taken from the top, middle, and bottom of the box were evaluated after 1, 2, and 3 months of storage. The results are shown in FIGS. 3A-3C.

Observation of the samples showed no difference between samples with relation to time of storage. Samples taken from the bottom of the box were slightly clustered, with the clusters being easy to break. On average, 7% of the samples showed light surface deformation.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A stable chewy confectionery product comprising starch and a sweetener comprising sucrose and glucose syrup, wherein the sucrose to glucose ratio in the stable chewy confectionery product is from about 75:25 to about 65:35, wherein the sucrose includes icing sugar having a particle size of from about 150 μm to about 200 μm, wherein the stable chewy confectionery product comprises the sweetener in an amount of at least 75% by weight on a dry basis of the stable chewy confectionery product, comprises the starch in an amount of from about 0.2% to about 0.9% by weight on a dry basis of the stable chewy confectionery product and has a water content of 4.5% to 6.5% by weight of the stable chewy confectionery product, wherein the stable chewy confectionery product has a weight of about 4 g or less, wherein 60% to 90% of the sucrose is crystallized from crystal nuclei into sucrose crystals having a size of about 30 μm or less prior to formation, wherein the icing sugar is in an amount of from about 2% to about 3% by weight on a dry basis of the stable chewy confectionery product to promote crystallization, wherein the starch in the stable chewy confectionery product consists of high amylose starch, wherein the stable chewy confectionery product is uncoated and unwrapped, and wherein the stable chewy confectionery product has a water activity that increases and/or decreases between 0.40 and 0.42 between months 8 and 11, and that stabilizes to be substantially the same when measured between months 11 and 12 in a 12 month period.

2. The stable chewy confectionery product of claim 1, wherein the sucrose to glucose ratio in the stable chewy confectionery product is about 70:30.

3. The stable chewy confectionery product of claim 1, wherein the stable chewy confectionery product has a weight of about 2.5 g or less.

4. The stable chewy confectionery product of claim 1, comprising the sweetener in an amount of at least 80% by weight on a dry basis of the stable chewy confectionery product.

5. The stable chewy confectionery product of claim 1, wherein the stable chewy confectionery product has a water content of about 5% to about 6% by weight of the stable chewy confectionery product.

6. The stable chewy confectionery product of claim 1, wherein 80% to 90% of the sucrose present in the stable chewy confectionery product is crystallized and wherein the sucrose crystals have a size of about 15 μm to about 30 μm.

7. The stable chewy confectionery product of claim 1, comprising:
the sweetener in an amount of at least 80% by weight on a dry basis of the stable chewy confectionery product;
the high amylose starch in an amount of from about 0.6% to about 0.9% by weight on a dry basis of the stable chewy confectionery product; and
wherein the sucrose to glucose ratio in the stable chewy confectionery product is from about 70:30 to about 65:35, and the stable chewy confectionery product has a weight of about 2.5 g or less.

8. The stable chewy confectionery product of claim 1, wherein the sucrose to glucose ratio in the stable chewy confectionery product is about 75:25.

9. The stable chewy confectionery product of claim 8, wherein the stable chewy confectionery product has a water content of 4.5% to 5.5% by weight of the stable chewy confectionery product.

10. The stable chewy confectionery product of claim 8, wherein the stable chewy confectionery product has a water content of 4.5% by weight of the stable chewy confectionery product.

11. The stable chewy confectionery product of claim 8, wherein the stable chewy confectionery product has a water content of 5.7% by weight of the stable chewy confectionery product.

12. The stable chewy confectionery product of claim 1, wherein the stable chewy confectionery product is taffy.

13. A stable chewy confectionery product selected from the group consisting of toffee, gummies, and taffy, the stable chewy confectionery product comprising high amylose corn starch as a gelatin replacer and a sweetener comprising sucrose and glucose syrup, wherein the sucrose to glucose ratio in the stable chewy confectionery product is from about 75:25 to about 65:35, wherein the sucrose includes icing sugar having a particle size of from about 150 μm to about 200 μm, wherein the stable chewy confectionery product comprises the sweetener in an amount of at least 75% by weight on a dry basis of the stable chewy confectionery product, wherein the stable chewy confectionery product comprises the high amylose corn starch in an amount of from about 0.6% to about 0.9% by weight on a dry basis of the stable chewy confectionery product and has a water content of 4.5% to 5.5% by weight of the stable chewy confectionery product, wherein the stable chewy confectionery product has a weight of about 4 g or less, wherein 70% to 90% of the sucrose is crystallized from crystal nuclei prior to formation, wherein sucrose crystals that have a size of about 30 μm or less are present in the stable chewy confectionery product, wherein the high amylose corn starch provides a desirable chewy texture, and wherein the stable chewy confectionery product has a water activity that increases and/or decreases between 0.40 and 0.42 between months 8 and 11, and that stabilizes to be substantially the same when measured between months 11 and 12 in a 12 month period.

14. The stable chewy confectionery product of claim 13, wherein the sucrose to glucose ratio in the stable chewy confectionery product is about 70:30.

15. The stable chewy confectionery product of claim 13, wherein the icing sugar is in an amount of from about 2.6% to 20% by weight on a dry basis of the stable chewy confectionery product to promote crystallization.

16. The stable chewy confectionery product of claim 13, wherein the sucrose crystals have a size of 30 μm.

17. The stable chewy confectionery product of claim 13, wherein the stable chewy confectionery product is free from additional texturizing agents and has a texture similar to a traditional chewy confectionery product comprising gelatin.

* * * * *